Jan. 15, 1957  B. J. FARROW  2,777,485
MEANS FOR CUTTING UNIFORMLY SPACED TENONS
Filed May 26, 1955  2 Sheets-Sheet 1
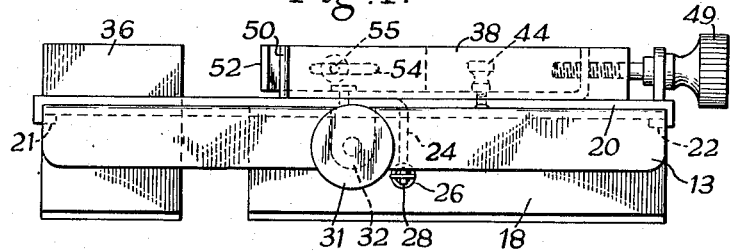
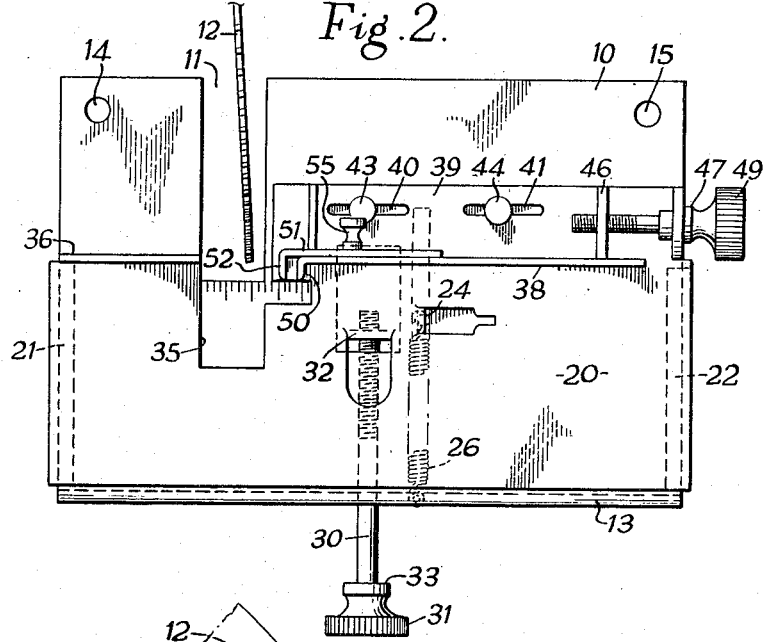
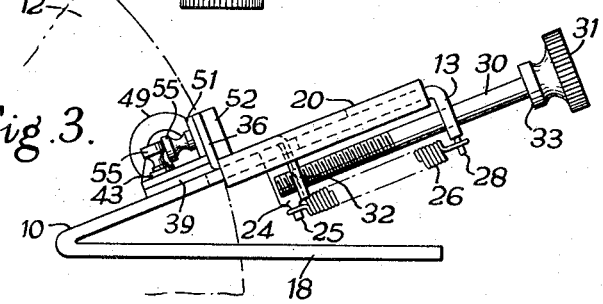
INVENTOR
BENJAMIN JOHN FARROW
BY
Young, Emery + Thompson
ATTORNEYS Jan. 15, 1957 B. J. FARROW 2,777,485
MEANS FOR CUTTING UNIFORMLY SPACED TENONS
Filed May 26, 1955 2 Sheets-Sheet 2
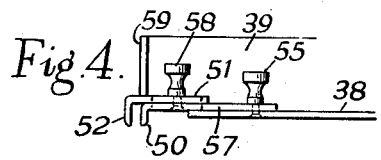
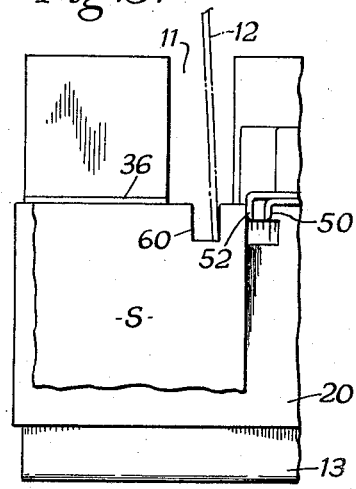
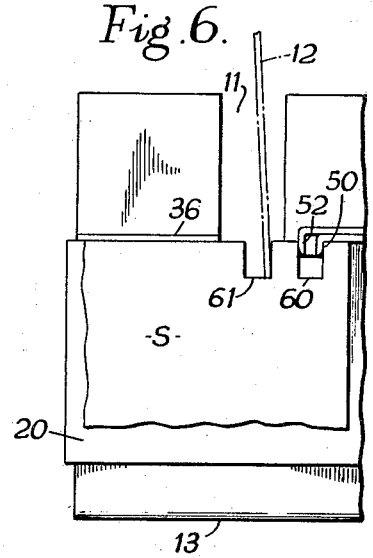
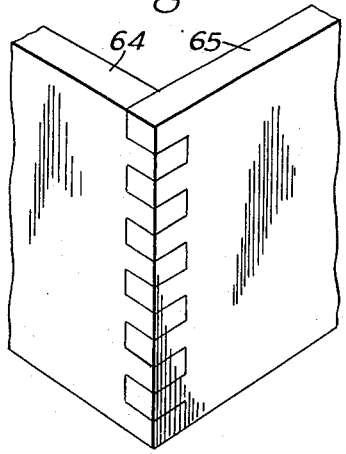
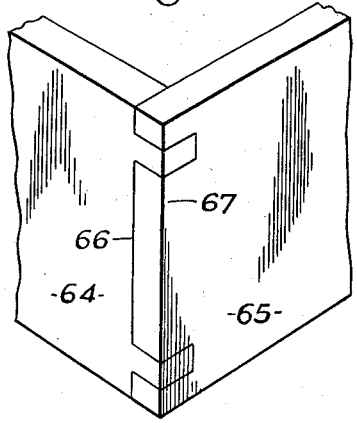
INVENTOR
BENJAMIN JOHN FARROW
BY
ATTORNEYS

United States Patent Office 2,777,485
Patented Jan. 15, 1957

2,777,485

MEANS FOR CUTTING UNIFORMLY SPACED TENONS

Benjamin J. Farrow, Wimborne, England

Application May 26, 1955, Serial No. 511,344

4 Claims. (Cl. 144—198)

This invention relates to means for cutting wood, plastics, and other materials especially to form a castellated or crenellated type of joint such as is commonly required at the corners of a box between adjacent sides each of which has a series of rectangular gaps at regularly spaced intervals, the gaps of each side receiving the rectangular projections of the other side.

According to the invention the gaps are cut with the aid of a gauge device comprising a gauge plate movable towards and from a cutting tool carrying at least one work locating abutment which locates the position of the work towards the cutting tool, said plate also carrying a narrow projection extending forwardly (i. e. towards the operator) and adapted to enter the gaps in the work, one side of said projection adjacent the recess serving as a transverse locating stop, and the plate being urged resiliently forwards up to a front stop and movable towards the tool up to an adjustable rear stop. The projection is preferably adjustable transversely.

The tool is preferably a single disc saw but may be a chain saw or other cutting means.

A constructional form of the invention will now be described with reference to the accompanying diagrammatic drawings wherein:

Figure 1 is a front view of a gauge device made in accordance with the invention;

Figure 2 is a plan view thereof;

Figure 3 is a side elevation thereof but with an addition;

Figure 4 is a detail of a modification;

Figures 5 and 6 are plan illustrations showing how the device is used; and

Figures 7 and 8 are perspective views of joints made with the aid of the device.

A base plate 10 is slotted at 11 to receive a wobble saw blade 12, and has its front edge turned down to form a flange or front stop 13. The base plate has bolt holes 14, 15 whereby it can be bolted to a saw bench. If desired as shown in Figure 3 the base plate may be connected to an underneath plate 18 at an angle thereto (which may be adjustable if desired) to bring the base plate or the work thereon approximately into radial alignment with the saw. When the plate 18 is provided the holes 14, 15 will be provided in this plate.

Mounted slidably on the base plate 10 is a gauge plate 20 which has its side edges 21, 22 turned under to form channels engaging with a sliding fit around the edges of the base plate. The rear ends of these edges engage the front stop 13.

The gauge plate carries an abutment 24 provided with a pin 25. A spring 26 engages on the pin 25 and on a pin 28 on the flange 13 so as to hold the gauge plate resiliently in its forward position. A screw 30 carries an adjusting knob 31 at its forward end and at its rear end it is threaded into a tapped hole in a lug 32 on the gauge plate 20. The rear surface 33 of the knob 31 serves to limit the forward movement of the gauge plate on the base plate by engaging the flange 13 through which the screw 30 slides freely.

The gauge plate 20 is slotted at 35 to receive the saw and on one side of the slot 35 the gauge plate has its forward edge bent up to form a work locating abutment 36. On the other side of the slot 35 is another work locating abutment 38. The abutments 36, 38 locate the work towards the saw. The abutment 38 is separate from the plate 20 and attached thereto for transverse adjustment. For this purpose the abutment 38 is mounted on an adjustment plate 39 which has two slots 40, 41 engaged respectively by a guide pin 43 and clamping screw 44 attaching to the plate 20. A lug 46 on the abutment 38 has a tapped hole therein engaged by an adjusting screw 47 provided with an adjusting knob 49.

The abutment 38 has one end bent forwards to form a projection 50. The abutment 38 also carries a strip 51 one end of which is bent forwards to form a projection 52. The strip 51 is adjustable transversely by means of a slot 54 therein and a clamping screw 55 whereby the projections 50, 52 are adjustable separably.

In the modification shown in Figure 4 the projection 50 is also carried on a separate strip 57, pivotally attached by screw 55 to the abutment 38. The strip 51 is attached to the strip 57 adjustably by a screw 58. The two projections 50, 52 can be removed to an inoperative position by pivoting about 55 when it is required to use the saw for cutting out a large gap between a series of gaps at each end. The plate 39 may have a turned up part 59 to support the strips 51, 57.

When cutting a piece of wood or other materials it is placed with its rear edge against the abutment 36 with its side at one end against the projection 52 as shown in Figure 5 and the material is then pushed towards the saw carrying the plate 20 with its against the spring 26. A gap 60 having been cut, the spring 26 is allowed to return the plate 20 to its position of rest, carrying the material with it. The material is then moved transversely to engage the projections 50, 52 in the gap 60 with the projections 50, 52 adjusted so as to fill the gap. The material is then pushed forward to cut the next gap 61, and so on.

The saw may be set at an angle to its axis of rotation in order to cut a gap of required width. The saw may be mounted in a lathe chuck and the gauge device may be mounted on the cross-slide after removal of the top slide; adjustments can then be effected by the lead screw and the cross-slide screw.

The kind of combing joint which can be made with the aid of the invention is shown in Figure 7 in which two sides of a box 64, 65 have their ends formed with regular gaps so as to engage each other with a tight or loose fit as desired. In the modified joint shown in Figure 8 the side 64 has a large gap 66 between two projections or tenons at each side. This gap 66 may be formed by removing the projections 50, 52 as described with reference to Figure 4. The gap 66 is engaged by a part 67 of corresponding size on the side 65.

I claim:

1. A gauge and work-feeding device for use in cutting gaps at regular intervals comprising a support movable towards and from a cutting tool in the direction of cutting, at least one work locating abutment which is carried by said support and which locates the edge of the work to be cut initially at a distance from the cutting tool, a pair of narrow projections also carried by said support and located above the support and extending away from the tool and adapted to enter each of the gaps in the work in turn after it is cut, said projections serving as a transverse locating stop for the work for successive cuts, means for adjusting said projections in relation to each other transversely of the cutting tool, means for adjusting said projections in unison transversely of the cutting tool, a first stop for limiting the movement of the support away from the cutting tool, means for resiliently urging said support backwards back to the first stop, an adjustable second stop, for limiting the movement of the support towards the cutting tool, said support being movable against the action of said resilient means up to said second stop to bring the edge of the work into the path of action of the cutting tool.

2. A gauge and work-feeding device as claimed in claim 1 wherein said projections are movably attached to the abutment so as to be displaceably adjustable thereon.

3. A gauge and work-feeding device as claimed in claim 1 comprising a base plate on which said support is slidably mounted, said support consisting of a plate having a cutting gap and having a pair of said abutments on opposite sides of said gap.

4. A gauge and work-feeding device comprising a base plate, a first stop means carried by the base plate, second stop means carried by the base plate, means for adjusting the second stop means in the direction towards and away from a cutting tool, a gauge plate slidably mounted on said base plate and limited in movement between the first stop means and the second stop means, spring means urging said gauge plate away from the cutting tool and towards the first stop means, an upstanding abutment on said gauge plate for engagement by the work, means for adjusting said abutment transversely of the gauge plate, a pair of projections on said abutment extending away from the cutting tool above the gauge plate, and means for adjusting one of said projections on the abutment transversely of the gauge plate in relation to the other projection, said projections being thus adapted to enter and fit the gaps in the work in turn after each is cut to position the work for succeeding cuts.

References Cited in the file of this patent

UNITED STATES PATENTS

| | | |
|---|---|---|
| 215,897 | Du Bois | May 27, 1879 |
| 1,043,285 | Zika | Nov. 5, 1912 |
| 1,651,846 | Stauder | Dec. 6, 1927 |
| 1,713,329 | Clayton | May 14, 1929 |
| 1,794,859 | Maass | Mar. 3, 1931 |
| 2,581,049 | Schempers | Jan. 1, 1952 |